United States Patent [19]

Kamioka et al.

[11] Patent Number: 5,419,206
[45] Date of Patent: May 30, 1995

[54] PHASE INDEPENDENT TORQUE DETECTION AND PROCESSING CIRCUIT FOR SENSING DEVICE

[75] Inventors: Hideki Kamioka; Kazunori Senzaki; Masahiko Shimamura, all of Gumma, Japan

[73] Assignee: Japan Electronic Control Systems Co., Ltd., Isezaki, Japan

[21] Appl. No.: 969,056

[22] Filed: Oct. 30, 1992

[30] Foreign Application Priority Data

Nov. 5, 1991 [JP] Japan .................. 3-099052 U

[51] Int. Cl.6 .................. G01L 3/10; G01R 33/18
[52] U.S. Cl. .................. 73/862.333; 324/209; 324/233
[58] Field of Search .............. 324/209, 233, 234, 238, 324/239; 73/862.08, 862.331, 862.333, 862.334, 862.69

[56] References Cited

U.S. PATENT DOCUMENTS

| | | | |
|---|---|---|---|
| 3,676,772 | 7/1972 | Lee | 324/233 |
| 3,895,290 | 7/1975 | Audenard et al. | 324/233 |
| 3,926,264 | 12/1975 | Bardwell et al. | 173/12 |
| 4,215,310 | 7/1980 | Schwerer, III | 324/238 |
| 4,352,295 | 10/1982 | Maehara et al. | 73/862.34 |
| 4,697,459 | 10/1987 | Nonomura et al. | 73/862.36 |
| 4,719,421 | 1/1988 | Kerr | 324/233 |
| 4,894,618 | 1/1990 | Candy | 324/233 X |

FOREIGN PATENT DOCUMENTS

| | | |
|---|---|---|
| 3827257 | 2/1990 | Germany . |
| 61-191930 | 8/1986 | Japan . |
| 2-151739 | 6/1990 | Japan . |
| 2-271229 | 11/1990 | Japan . |

Primary Examiner—Gerard R. Strecker
Attorney, Agent, or Firm—Foley & Lardner

[57] ABSTRACT

A circuit for detecting and processing a signal from a sensing device such as a torque sensor is disclosed in which a first peak hold circuit detects a first peak value of an output AC signal of an oscillator and a second peak hold circuit detects the peak value of an output signal of a differential amplifier. The differential amplifier is connected across an output end of a bridge circuit for detecting a change in the output voltage from the torque sensor. A sign of a variable in the torque sensor is determined according to the first and second hold values derived from the first and second hold circuits. The magnitude of the variable of the torque sensor is detected according to the magnitude of the second peak value of the second hold circuit.

9 Claims, 5 Drawing Sheets

PHASE INDEPENDENT TORQUE DETECTION AND PROCESSING CIRCUIT FOR SENSING DEVICE

BACKGROUND OF THE INVENTION

1. Field of The Invention

The present invention relates generally to a processing circuit for processing an output signal from a sensing device such as a magnetostriction type torque sensor, strain gauge, or differential transformer transducer.

2. Description of The Background Art

Various types of processing circuits for a sensing device, for example, magnetostriction type torque sensor have been proposed.

Japanese Patent Application First Publications No. Showa 61-191930, No. Heisei 2-151739, and No. Heisei 2-271229 published on Aug. 26, 1986, on Jun. 11, 1990, and on Nov. 6, 1990 respectively exemplify such previously proposed processing circuits for sensing devices.

SUMMARY OF THE INVENTION

It is, therefore, a principal object of the present invention to provide an improved detection and processing circuit for a sensing device having an improved accuracy of detection.

The above-described object can be achieved by providing a circuit for processing and detecting a signal from a sensing device, comprising: a) a bridge circuit having an equivalent circuit of the sensing device; b) an oscillator generating and producing an AC voltage input to said bridge circuit; c) a differential amplifier which detects an output voltage change due to an electrical change in the equivalent circuit of the bridge circuit from the bridge circuit; d) a first peak hold circuit for holding a peak value of the input voltage from the oscillator via a phase adjuster; e) a second peak hold circuit for holding a peak value of an output voltage derived from the differential amplifier; f) an A/D converter for digitalizing a peak value of the second peak hold circuit; g) a sign discriminator for discriminating a sign according to the peak values from said first and second hold circuits; and h) a signal output circuit for outputting a signal representing a variable of the equivalent circuit of the sensing device with the sign derived from the sign discriminator.

The above-described object can also be achieved by providing a circuit for processing and detecting a signal from a sensing device, comprising: a) a bridge circuit having an equivalent circuit of the torque sensor; b) an oscillator generating and producing an AC voltage input to said bridge circuit; c) a differential amplifier which detects an output voltage change due to an electrical change in the equivalent circuit from the bridge circuit; d) a first peak hold circuit for holding a peak value of the input voltage from the oscillator via a phase adjuster; e) a second peak hold circuit for holding a peak value of an output voltage from the differential amplifier; f) an A/D converter for digitalizing a peak value of the second peak hold circuit; g) a sign discriminator for discriminating a sign according to the peak values from said first and second hold circuits; and f) a signal output circuit for outputting a signal representing a detected variable of the equivalent circuit of the torque sensor with the sign derived from the sign discriminator.

DESCRIPTION OF THE PREFERRED EMBODIMENT

Reference will hereinafter be made to the drawings in order to facilitate a better understanding of the present invention.

Before explaining a detection and processing circuit for a sensing device according to the present invention, a previously proposed detection and processing circuit for a sensing device will be explained below.

Figure 1:
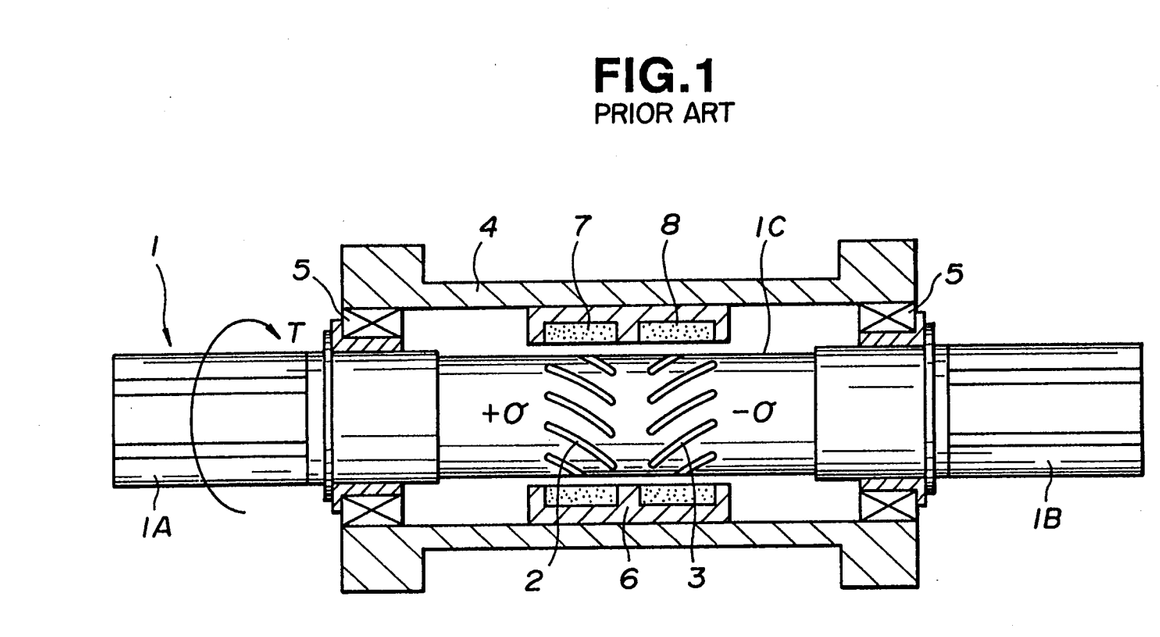
FIG. 1 is an exploded view of a magnetostriction type torque sensor applicable to a detection and processing circuit according to the present invention.

FIG. 1 shows a sensing body of a torque sensor using magnetostriction.

FIG. 1 the sensing body 1 includes a magnetostrictive shaft formed of a magnetostrictive material such as a chromemolybdenum steel. The magnetostrictive shaft 1 is interposed in a drive axis.

Both ends of the magnetostrictive shaft 1 are constituted by input side attaching portion 1A and output side attaching portion 1B, respectively.

An intermediate portion thereof is constituted by a slit formed portion 1C. An outer periphery of the slit formed portion is provided with a plurality of pairs of consecutive oblique slits 2, 3, each pair of slits 2, 3 being inscribed so as to face against each other at 90 degrees as shown in FIG. 1. Each one end of the slits 2, 3 is upward with respect to the other opposing end of the slits 2, 3 at 45 degrees as viewed from FIG. 1.

A coil fixing member 4 is installed around the outer periphery of the slit formed portion 1C via a pair of bearings 5, 5. The coil fixing member 4 is relatively rotatable to the magnetostrictive shaft 1.

It is noted, however, that the coil fixing member 4 is attached onto an external fixing member not shown so as to disable the rotation of the fixing member 4 itself. A ring-shaped core member 6 is fixed onto an inner peripheral side of the coil fixing member 4. The core member 6 is provided with detection coil members 7, 8 at predetermined positions opposing the pair of slits 2, 3, respectively. Self inductances of the detection coils 7, 8 are denoted by $L_1$, $L_2$, respectively.

Figure 2:
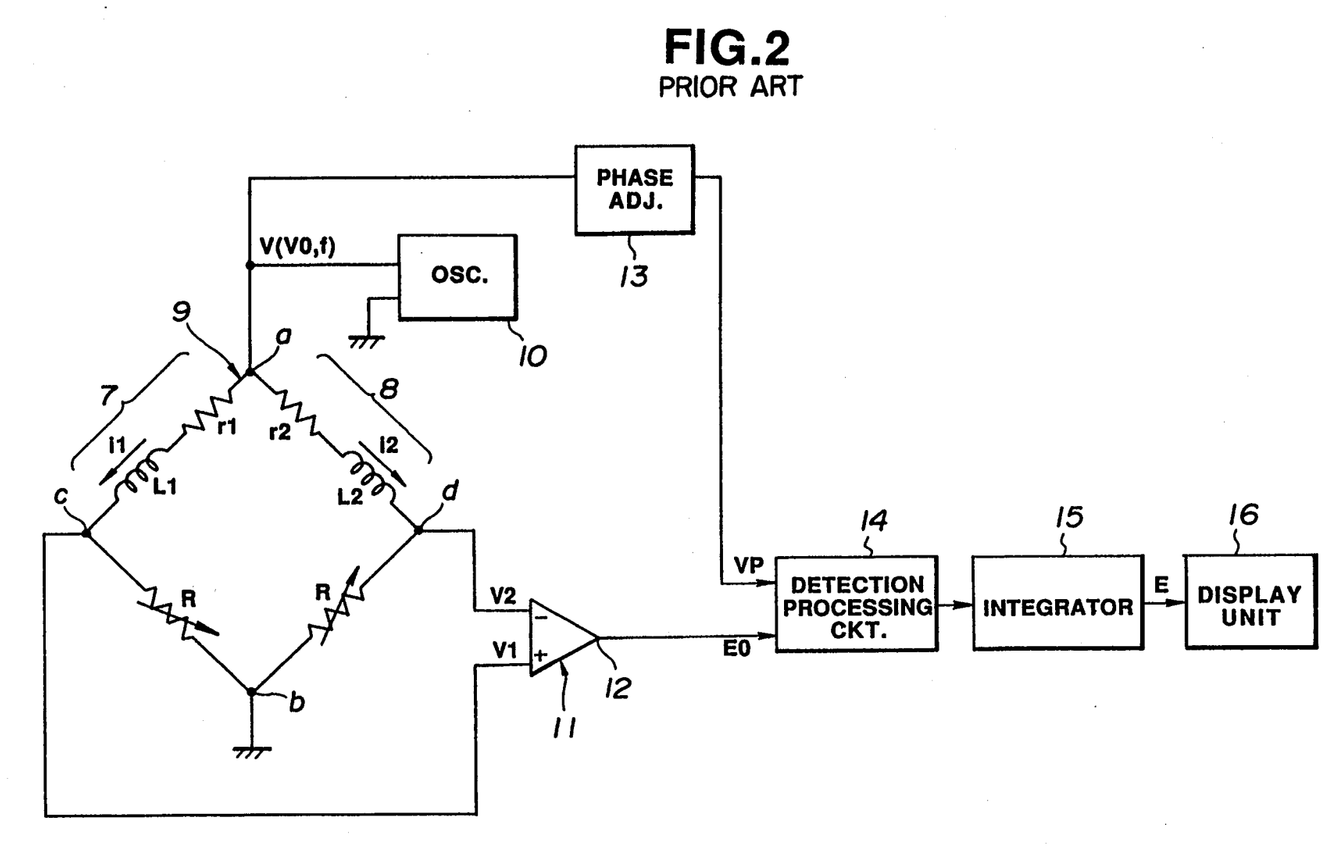
FIG. 2 is a circuit block diagram of a previously proposed detection and processing circuit for a sensing device such as the torque sensor shown in FIG. 1.

FIG. 2 shows the previously proposed detection and processing circuit for the sensing device using the torque sensor shown in FIG. 1.

In FIG. 2, a bridge circuit 9 as a detection circuit is provided in which a first arm is constituted by the detection coil member 7 having the self inductance L1 and iron loss resistance r1, a second arm adjacent to the first arm is constituted by the detection coil member 8 having the self inductance L2 and iron loss resistance r2, and third and fourth arms opposing to the first and second arms are constituted by variable resistors R, R.

An oscillator 10 as will be described later is connected between a first junction a and a second junction b. The first junction connects the first arm to the second arm. The second junction connects the third arm to the fourth arm. A third junction c connects the first arm to the third arm. A fourth junction d connects the second arm to the fourth arm.

The third junction c serves as an output terminal providing an output voltage V1 derived from the detection coil 7 and the fourth junction d serves as an output terminal providing an output voltage V2 derived from the detection coil 8. The third and fourth junctions c and d are connected to input terminals of a differential amplifier 11 as will be described later.

The detection and processing circuit generally includes the oscillator 10, a differential amplifier 11, a phase adjuster 13, a detection (modulation) processing circuit 14, and integrator 15.

The oscillator 10 generates an AC voltage V having a peak value of V0, frequency of f (for example, 30 KHz). The output end of the oscillator 10 is connected to a junction a of the bridge circuit 9 and is connected to a phase adjuster 13.

The differential amplifier 11 is constituted by an operational amplifier whose positive and negative input terminals are connected to the third junction c and fourth junction d, respectively and whose output terminal 12 is connected to the detection (modulation) processing circuit 14 to provide an output voltage E0.

The phase adjuster 13 is connected to the output end of the oscillator 10. An input end of the phase adjuster 13 receives the AC voltage V of a sinusodial waveform having the peak value of V0 and frequency of f from the oscillator 10.

The phase adjusted voltage Vp from the phase adjuster 13 is a reference waveform 18 shown in FIG. 3 as will be described later. The phase adjusted voltage Vp is synchronized to the output voltage V1 (=V2) output from the bridge circuit 9 which is delayed by a phase angle $\alpha_1$ (=$\alpha_2$) when no torque T is applied to the magnetostrictive shaft 1.

The detection (modulation) processing circuit 14 has a pair of input ends, one input end receiving the output voltage E0 from the output end of the operational amplifier (differential amplifier) t1 and the other end receiving the output voltage Vp of the phase adjuster 13.

The detection (modulation) processing circuit 14 synchronizes and detects a portion of the output voltage E0 synchronized with the phase adjusted voltage VP and supplies the portion of detection to the integrator 15.

The integrator 15 serves to integrate the supplied voltage from the detection and processing circuit 14 to provide a DC voltage E for a display unit 16 such as a DC voltage meter.

It is noted that each adjustment of the variable resistors R, R in the bridge circuit 9 causes the bridge circuit 9 to be balanced or to be in an equilibrium state so that the output voltages V1, V2 from the third and fourth junctions provide the mutually same waveform when the torque T to be applied to the shaft 1 indicates zero.

At this time, the output voltage E0 from the output terminal 12 of the differential amplifier 11 is adjusted so as to provide zero voltage.

The torque sensor having the two coil members is described above.

When the AC voltage V from the oscillator 10 is applied to the detection coils 7, 8, a magnetic path is formed on a surface of the magnetostrictive shaft 1. However, since the plurality of slits 2, 3 are formed on the surface of the slit formed portion 1C, the magnetic path generated due to a surface magnetic field is formed along the slits 2, 3.

On the other hand, when the torque T in the direction marked by an arrow shown in FIG. 1 (counterclockwise direction) is applied to the input side attaching portion 1A of the magnetostrictive shaft 1, a tensile stress $+\sigma$ is generated on each slot 2 and a compressly stress $-\sigma$ is generated on the opposing slot 3. When a positive magnetostrictive material is used for the magnetostrictive shaft 1, a permeability $\mu$ is increased according to the tensile stress $+\sigma$ and a permeability $\mu$ is decreased due to a compressly stress $-\sigma$.

Then, the self inductances $L_1$, $L_2$ for the detection coils 7, 8 are expressed as follows:

$$L = k \cdot \mu N^2 S / l \tag{1}$$

wherein $\mu$ denotes a permeability,
N denotes a number of turns of the corresponding coil member,
S denotes a magnetic path cross sectional area, and
l denotes an average length of the magnetic path.

In the bridge circuit 9, since the detection coil member 7 having the self inductance L1 and iron loss resistance r1 is serially connected to the variable resistor R and the detection coil member 8 having the self inductance L2 and iron loss resistance r2 is serially connected to the variable resistor R, the currents i1, i2 flowing through the coil members 7, 8 are expressed as follows:

$$i_1 = V / \sqrt{(r1 + R)^2 + (2\pi f L_1)^2} \tag{2}$$

$$i_2 = V / \sqrt{(r2 + R)^2 + (2\pi f L_2)^2}$$

The output voltages $V_1$, $V_2$ of the third and fourth junctions c, d are expressed as follows:

$$V_1 = i_1 R \sin(2\pi f t - \alpha_1)$$

$$V_2 = i_2 R \sin(2\pi f t - \alpha_2)$$

$$\alpha_1 = \tan^{-1} 2\pi f L_1 / (R + r1)$$

$$\alpha_2 = \tan^{-1} 2\pi f L_2 / (R + r2) \tag{3}$$

wherein $\alpha_1$, $\alpha_2$ denote phase angles.

The output voltage E0 output from the output terminal 12 of the differential amplifier 11 is expressed as follows:

$$E_0 = A \times (V_1 - V_2) \tag{4}$$

wherein A denotes an amplification factor.

The detection operation of the bridge circuit 9, differential amplifier 11, and detection and processing circuit 14 will be described with reference to FIGS. 3 through 5.

Figure 3:
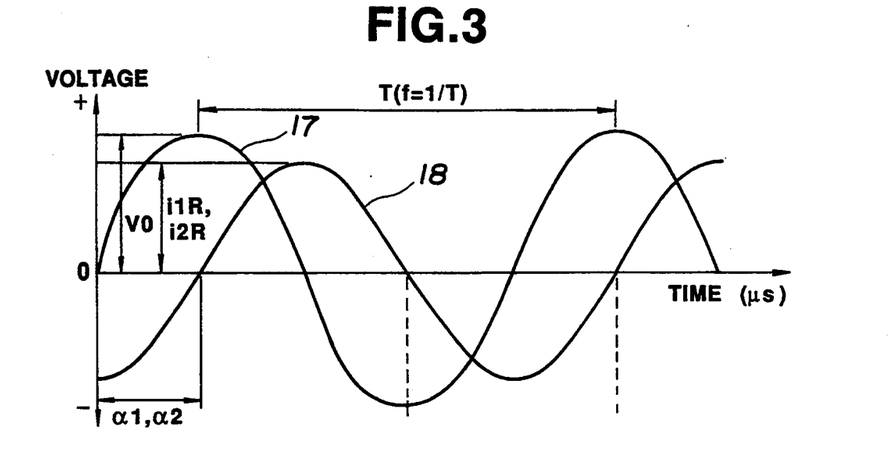
FIGS. 3 through 5 are waveform charts of voltage with respect to time in the case of the detection and processing circuit for the sensing device shown in FIG. 2.

In FIG. 3, numeral 17 denotes the AC voltage waveform V of the oscillator 10 having the oscillation frequency of f (f=1/T) (for example, 30 KHz) and peak value of V0.

On the other hand, numeral 18 denotes the reference waveforms of the output voltages V1 and V2 at the third and fourth junctions c and d at an initial state of the torque sensor where no torque T is applied.

The reference waveforms 18 are sinusodial waveforms of the peak values $i_1R$ ($i_2R$) and frequency of f and having a phase difference of $\alpha_1(=\alpha_2)$ from the AC voltage waveform of 17 of the oscillator 10. Since no torque T is applied to the magnetostrictive shaft 1, the waveforms of the output voltages V1 and V2 are mutually the same. The reference waveform 18 gives the phase adjusted voltage Vp.

Next, the waveforms of the output voltages V1 and V2 when a torque T in a reverse direction to the arrow marked direction as viewed from FIG. 1 is applied will be explained below with reference to FIGS. 4 and 5.

Figure 4:
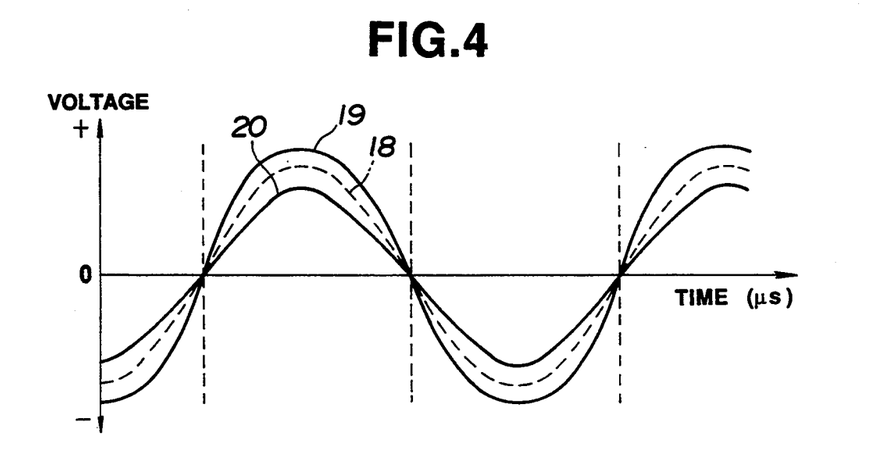

In FIG. 4, numeral 19 denotes the waveform of the output voltage V1 and numeral 20 denotes the waveform of the output voltage V2.

Since the voltage waveform 19 of the output voltage V1 is affected by the slits 2 so that the permeability $\mu$ is decreased according to the compressive stress $-\sigma$, the self inductance $L_1$ of the detection coil member 7 opposing the slits 2 is decreased in accordance with the equation (1), the amplitude of the current $i_1$ flowing through the detection coil 7 is decreased in accordance with the equation (2), and the peak value of $i_1R$ is increased in accordance with the equation (3).

In addition, since the waveform 20 of the output voltage V2 is affected by the opposing slits 3 so that the permeability $\mu$ is increased according to the tensile stress $+\sigma$, the self inductance L2 of the detection coil member 8 is increased in accordance with the equation (1), the amplitude of the current $i_2$ flowing through the detection coil member 8 is increased in accordance with the equation (2), and the peak value $i_2R$ is decreased in accordance with the equation (3).

Figure 5:
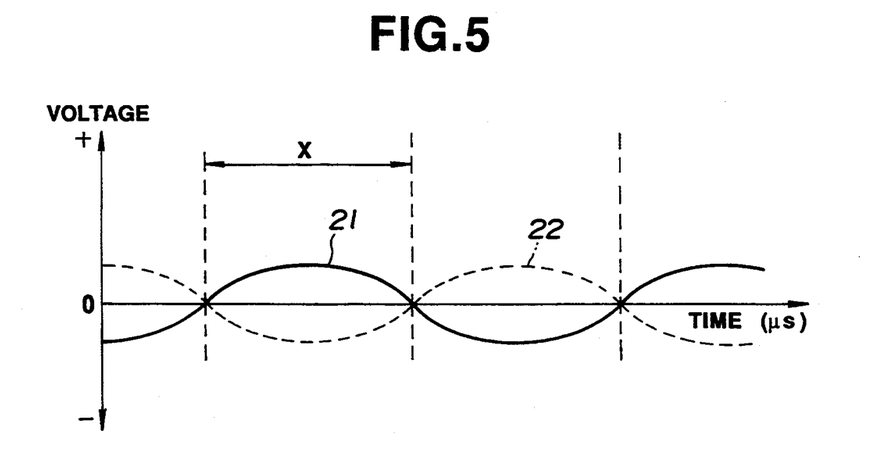

As shown in FIG. 5, the differential amplifier 11 provides the waveform 21 of output voltage $E_0$ according to a difference of the voltage waveforms 19, 20 of the output voltages V1 and V2 and amplifies the waveform 21 of the output voltage E0 by the amplification factor of A. Then, the output voltage E0 is converted into a relatively large voltage amplitude (voltage value) so that the detection signal in proportion to the torque in the direction of the arrow mark T is output to the detection and processing circuit 14 from its output terminal 12.

In the detection (modulation) and processing circuit 14, the output voltage E0 from the differential amplifier 11 is synchronized with the phase adjusted voltage Vp from the phase adjuster 13. A portion of the waveform 21 corresponding to a positive portion of the reference waveform 18 (detection region X in FIG. 5) is output to the integrator 15. The integrator 15 converts this portion into a corresponding DC voltage E so that the torque T acted upon the magnetostrictive shaft 1 is output to a display unit 16 as a positive DC voltage E.

On the other hand, in a case where the torque T in the direction of the arrow mark (counterclockwise direction) is applied to the magnetostrictive shaft 1 in FIG. 1, the permeability $\mu$ of the slits 2 is increased due to the tensile stress $+\sigma$. Therefore, the self inductance $L_1$ of the detection coil member 7 opposing the slits 2 is increased, the current $i_1$ is decreased, and the output voltage V1 is decreased.

On the other hand, since the permeability $\mu$ at the opposing slits 3 is decreased according to the compressive stress $-\sigma$, the self inductance L2 of the detection coil member 8 facing toward the slits 3 is decreased, the current $i_2$ flowing through the detection coil member 8 is increased, and the output voltage V2 is increased.

Thereafter, the amplitudes of output voltages V1, V2 are varied on the basis of a change in the permeability $\mu$ in accordance with the equations (1) and (3). The detection signal in proportion to the torque T in the arrow marked direction is output to the detection and processing circuit 14 as the output voltage E0 (refer to the dotted line waveform 22 of FIG. 5).

The detection and processing circuit 14 carries out the detection and processing for the waveform 22 of the output voltage E0 so that a negative DC voltage E corresponding to the torque T is output to the display unit 16 via an integrator 15.

However, in the detection and processing circuit 14 of the previously proposed detection and processing circuit described above, the output voltage E0 from the differential amplifier is synchronized to the phase adjusted voltage Vp and only a portion of the output voltage E0 corresponding to the positive portion of the phase adjusted voltage Vp is output to the integrator 15. Then, the integrator 15 converts the portion of the output voltage E0 into the DC voltage E.

Therefore, as appreciated from the equation (3), the phase differences $\alpha 1$, $\alpha 2$ due to the change in the self inductances L1, L2 are neglected.

Furthermore, since the voltage waveforms 19, 20 of the voltages V1 and V2 are varied with respect to the reference waveform 18 together with change in the amplitudes of the output voltages V1, V2, the differential Amplifier 11 provides the output voltage E0 having a phase angle when the output voltages V1, V2 are input thereinto.

Hence, since a deviation of the output voltage E0 occurs from the detection region X detected by the detection and processing circuit 14, an accurate detection of the torque cannot be made.

Figure 6:
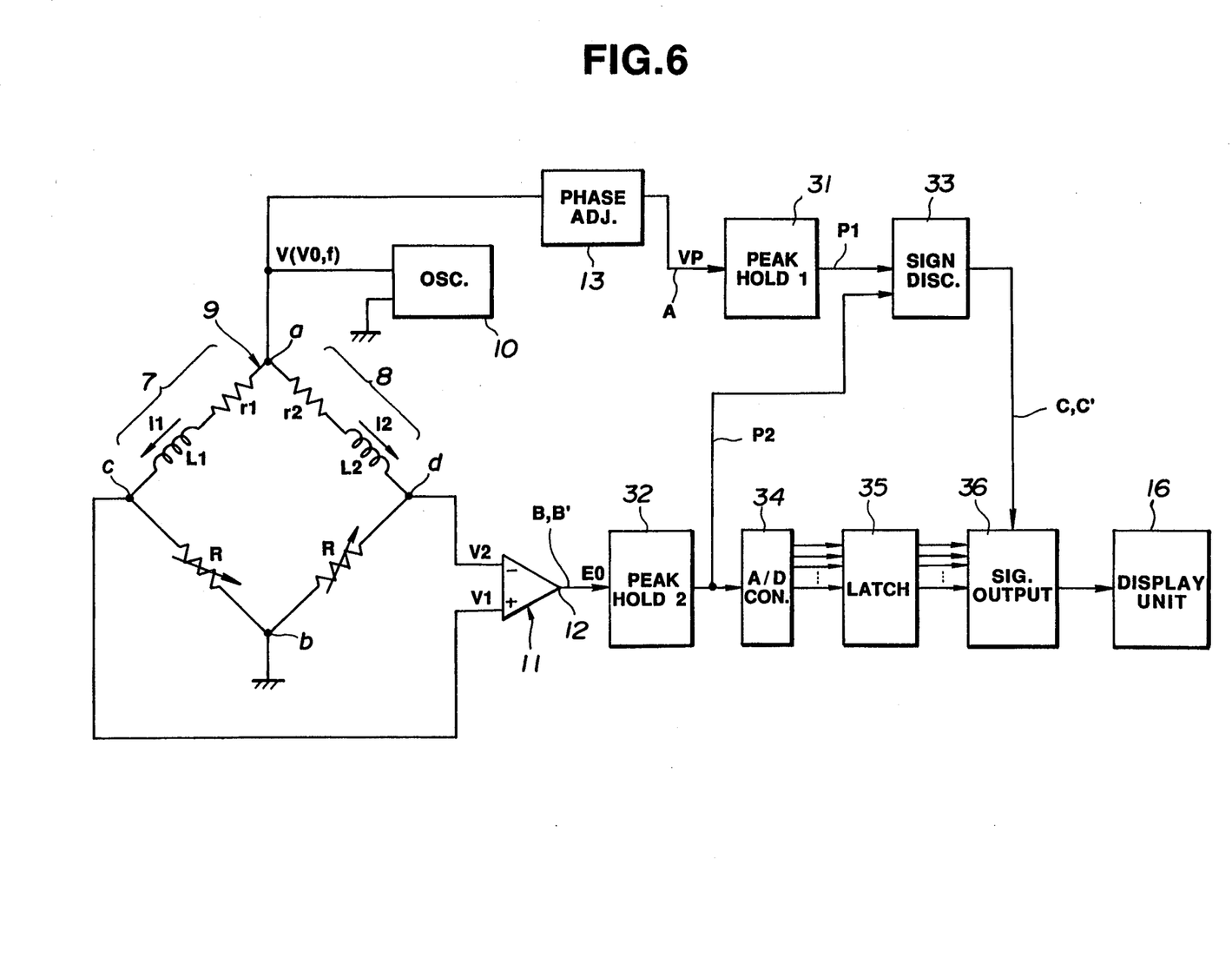
FIG. 6 is a circuit block diagram of a detection and processing circuit for a sensing device in a preferred embodiment according to the present invention.

FIG. 6 shows a preferred embodiment of the detection and processing circuit for a sensing device according to the present invention.

The same reference numerals as shown in FIG. 1 are used for the like elements designated in FIG. 6.

As shown in FIG. 6, a first peak hold-circuit 31, a second peak hold circuit 32, a sign discriminating circuit 33, an A/D converter 34, a latch circuit 35, a signal output circuit 36 are incorporated in the detection and processing circuit of FIG. 6.

FIGS. 7 through 11 show waveform charts in which a position at which the phase difference $\alpha_1(=\alpha_2)$ is deviated is zero (a reference) when no torque T is applied to the magnetostrictive shaft 1, neglecting the phase angle $\alpha_1(=\alpha_2)$. Symbol A in FIG. 7 denotes an output waveform of the phase adjusted voltage Vp from the phase adjusting circuit 13.

Figure 7:
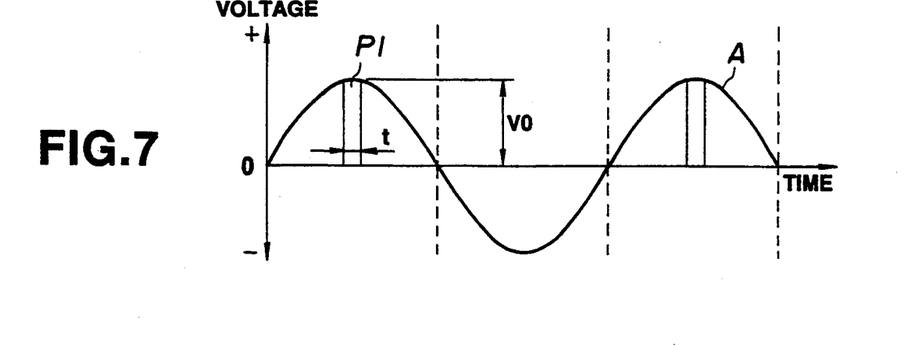
FIGS. 7 through 11 are waveform charts of a voltage variation with respect to time.

The first peak hold circuit 31 is connected to an output side of the phase adjuster 13 and holds the peak value of the AC voltage V as a first peak value P1 for a predetermined holding duration of time t as shown in P1 of FIG. 7.

Figure 8:
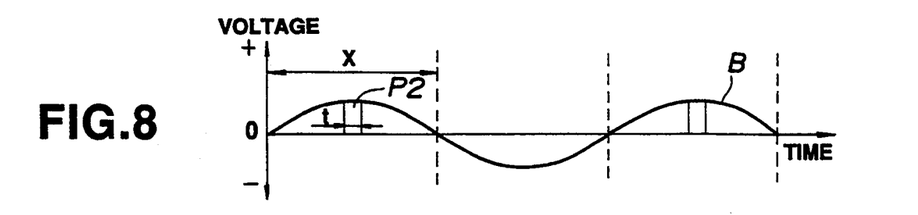
Figure 9:
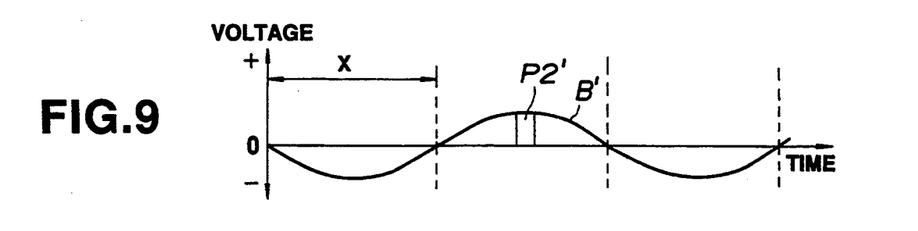

The second peak hold circuit 32 is connected to an output terminal 12 of the differential amplifier 11 and holds the peak value of the output voltage E0 from the differential amplifier 11 (B, B' of FIGS. 8 and 9) as second peak values P2, P2' having the predetermined hold duration of time t as denoted by P2, P2' of FIGS. 8 and 9.

The sign discriminator 33 determines the sign according to the peak hold circuits 31, 32. The sign discriminator 33 is constituted by logic circuits such as gate and NAND circuits.

The gate circuits of the sign discriminator 33 serve to open a range of the detection region X shown in FIGS. 8 and 9.

Figure 10:
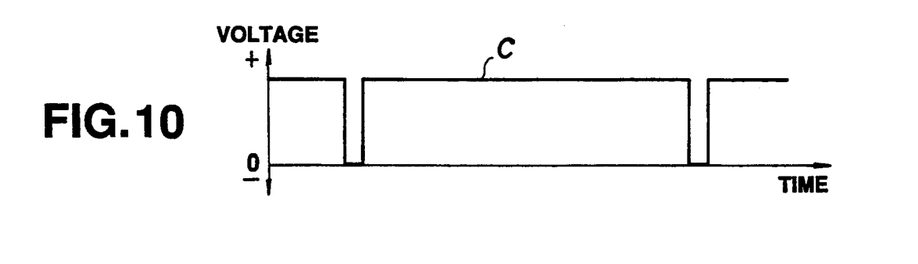

In a case where the second peak value $P_2$ is present in the detection region X as shown in FIG. 8, the NAND circuits of the sign discriminator 33 serve to output a negative sign signal C in FIG. 10.

Figure 11:
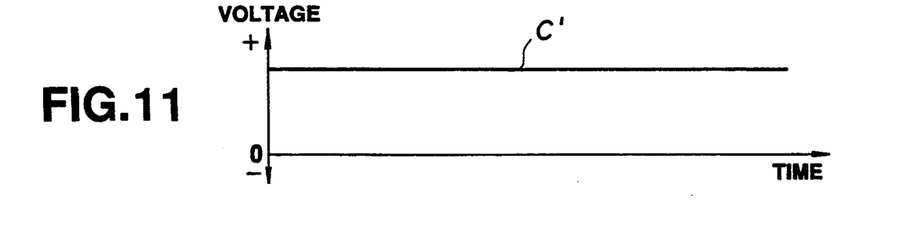

On the other hand, when the second peak value P2' is present out of the detection region X as shown in FIG. 9, the NAND circuits serve to output a positive sign signal C' in FIG. 11 to the signal output circuit 36.

The A/D converter 34 converts the second peak value P2, P2' output from the second peak hold circuit 32 into the corresponding digital signal. The digital signal is transmitted to the latch circuit 35.

The latch circuit 35 serves as a buffer for transmitting the digital signal from the A/D converter 34 for each second peak value P2, P2' to the signal output circuit 36.

The signal output circuit 36 inputs the digital signal from the latch circuit 35 and sign signal of C or C' from the sign discriminator 33, transmitting the digital signal with the sign to the display unit 16.

FIG. 7 shows the output waveform A (phase adjusted voltage Vp) from the phase adjuster 13 and first peak value $P_1$.

FIG. 8 shows the output waveform B from the differential amplifier 11 and the second peak value P2 when the torque T in the reverse direction (clockwise direction) to the arrow marked direction as viewed from FIG. 1 is applied.

FIG. 9 shows the output waveform B' from the differential amplifier 11 when the torque T in the arrow marked direction (counterclockwise direction) is applied to the magnetostrictive shaft 1 and second peak value P2'.

FIG. 10 shows the first peak value P1 when the input of the sign discriminator 33 is the first peak value P1 and sign signal C indicating negative at the time of the second peak value P2.

FIG. 11 shows the first peak value P1 according to the input of the sign discriminator 33 and the positive sign signal C' when the second peak value P2' is indicated.

The operation of the bridge circuit 9 and differential amplifier 11 is the same as described with reference to FIGS. 1 through 5.

For the detection of the magnitude of the torque T, the output waveform derived from the differential amplifier 11 is a waveform having the amplitude direction different according to the direction of the torque T applied to the magnetostrictive shaft 1 (clockwise direction or counterclockwise direction) as appreciated from the output waveforms B, B' in FIGS. 8 and 9. Depending on the magnitude of the torque, the waveforms B and B' indicate mutually different peak values.

The second peak hold circuit 32 detects the second peak values P2 and P2' according to the peak values. The A/D converter 34 digitizes the second peak values P2, P2'. The display unit 16 receives the digitized second peak values via the latch circuit 35 and signal output 36.

On the other hand, the second peak hold circuit 32 detects the second peak values P2, P2' corresponding to the peak values irrespective of the torque direction to be applied to the magnetostrictive shaft 1. Therefore, the second peak hold circuit 32 cannot detect the direction of the torque.

The sign discriminator 33 detects the first peak value P1 corresponding to the peak value V0 of the output waveform A detected by means of the first peak hold circuit 31 and detects the positions of the second peak values P2, P2' within the detection region X through the gate circuits.

The NAND circuit of the sign discriminator 33 serves to output the sign signal C indicative of negative sign to the signal output circuit 36 in a case where the second peak value P2 is detected to be present in the detection region X by means of the sign discriminator 33.

If the peak value is the second peak value P2' out of the detection region X, the sign signal C' indicative of the positive sign is output to the signal output circuit 36.

The signal output circuit 36 outputs the signal indicating the magnitude of the torque and its direction to the display unit 16 according to the digital signal from the latch circuit 35 and according to the output waveform from the sign discriminator 33.

The whole magnetostriction type torque sensor in the preferred embodiment detects the magnitude of the torque to be applied to the magnetostrictive shaft 1 by means of the second peak hold circuit 32. The peak value of the output voltage E0 output from the differential amplifier 11 has a value corresponding to the magnitude of the torque. Therefore, the magnitude of the torque can accurately be detected. In addition, since the peak value indicates the magnitude of the torque, the influence of the phase difference is eliminated and highly accurate torque detection can be detected.

In the preferred embodiment, the signal output circuit 36 outputs the torque detection signal to the display unit 16.

However, the signal output circuit 36 may be constituted by a serial-to-parallel converter.

Although the detection and processing circuit according to the present invention is applicable to the magnetostrictive torque sensor, the present invention is applicable to such a sensor as strain gauge or differential transformer type transducer.

As described hereinabove, since, in the detection and processing circuit for the sensing device such as the magnetostrictive torque sensing device according to the present invention, the peak value of the input voltage of the oscillator is detected by means of the first peak hold circuit via the phase adjuster, the peak value of the output voltage from the differential amplifier is detected by means of the second peak hold circuit, the peak value of the second peak hold circuit is digitalized by means of the A/D converter, the sign discriminator determines the sign according to the peak values from the first and second peak hold circuits, and the signal output circuit outputs the signal indicating the change quantity of the sensing device with its sign according to the outputs of the A/D converter and sign discriminator, the influence of the phase difference according to the variation in the sensing device is prevented and change quantity in the sensing device can accurately be detected at the signal output circuit.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A circuit for processing and detecting a signal from a sensing device, comprising:

a) a bridge circuit arranged to couple with the sensing device, having a first arm including a first iron loss resistance and a first variable inductor, said first arm being a first equivalent circuit of a first part of the sensing device having a first variable inductor varied according to a first direction and a first magnitude of a torque applied to said first part of the sensing device, a second arm including a second iron loss resistance and a second variable inductor, said second arm being a second equivalent circuit of a second part of the sensing device having a second variable inductor varied according to a second direction and a second magnitude of the torque applied to said second part of the sensing device, a third arm including a first variable resistor, and a fourth arm including a second variable resistor, a first junction defined between the first and second arms, a second junction defined between the third and fourth arms, a third junction defined between the first and fourth arms, and a fourth junction defined between the second and third arms, said variable resistors being adjusted so that a voltage at the third junction is equal to a voltage at the fourth junction whenever the bridge circuit is balanced and no torque is applied to the sensing device;

b) an oscillator generating and outputting an alternating voltage having a predetermined peak value and a predetermined frequency to the bridge circuit;

c) a differential amplifier detecting a change in voltage at one of the third and fourth junctions of the bridge circuit due to a change in inductance of one of the first and second variable inductors when the torque is applied to one of the first and second part of the sensing device, said differential amplifier outputting an output voltage according to a difference between the voltage at the third junction and the voltage at the fourth junction;

d) a phase adjuster outputting a reference voltage waveform at the predetermined frequency, the reference voltage waveform having a peak value corresponding to one of the voltages at the third and fourth junctions when no torque is applied to the sensing device, and the reference voltage waveform having a phase delay with respect to the alternating voltage of the oscillator corresponding to that of a voltage across one of the first and second variable inductors when no torque is applied to the sensing device;

e) a first peak hold circuit for holding the peak value of the reference voltage waveform supplied from the phase adjuster;

f) a second peak hold circuit for holding a peak value of the output voltage from the differential amplifier;

g) an A/D converter for digitizing said peak value held in the second peak hold circuit;

h) a sign discriminator for detecting a sign signal based on the peak values from said first and second hold circuits; and i) a signal output circuit, connected to said sign discriminator and said A/D converter, for outputting an output signal based on said digitized peak value and said sign signal detected by said sign discriminator representing the direction and magnitude of the torque applied to the sensing device.

2. A circuit for processing and detecting a signal from a sensing device as set forth in claim 1, wherein said differential amplifier includes an inverting input terminal connected to said fourth junction and a non-inverting input terminal connected to said third junction.

3. A circuit for processing and detecting a signal from a sensing device as set forth in claim 2, wherein said oscillator is connected to said first junction of the bridge circuit.

4. A circuit for processing and detecting a signal from a sensing device as set forth in claim 3, wherein said sensing device is constituted by a torque sensor of a magnetostriction type.

5. A circuit for processing a signal from a sensing device as set forth in claim 4, wherein said phase adjuster is connected to an output end of said oscillator and said first junction of the bridge circuit said phase adjuster outputting the reference voltage waveform representing the output signal of the oscillator having phase deviated from that of the voltage at the first junction when the torque is not applied to said torque sensor.

6. A circuit for processing and detecting a signal from a sensing device as set forth in claim 5, wherein the sign discriminator outputs the sign signal indicating the sign of minus to said signal output circuit when the phase range of the peak value of the second peak hold circuit is coincident with the phase range of the peak value of the first peak hold circuit and outputs the sign signal indicating the sign of plus when the phase range of the peak value of the second peak hold circuit is not coincident with the phase range of the peak value of the first peak hold circuit.

7. A circuit for processing and detecting a signal from a torque sensor of a magnetostrictive type, comprising:

a) a bridge circuit arranged to couple with the torque sensor, having a first arm including a first iron loss resistance and a first variable inductor, said first arm being a first equivalent circuit of a first part of the torque sensor device having a first variable inductor varied according to a first direction and a first magnitude of a torque applied to said first part of the torque sensor, a second arm including a second iron loss resistance and a second variable inductor, said second arm being a second equivalent circuit of a second part of the torque sensor device having a second variable inductor varied according to a second direction and a second magnitude of the torque applied to said second part of the torque sensor, a third arm including a first variable resistor, and a fourth arm including a second variable resistor, a first junction defined between the first and second arms, a second junction defined between the third and fourth arms, a third junction defined between the first and fourth arms, and a fourth junction defined between the second and third arms, said variable resistors being adjusted so that a voltage at the third junction is equal to a voltage at the fourth junction whenever the bridge circuit is balanced and no torque is applied to the torque sensor;

b) an oscillator generating and outputting an alternating voltage having a predetermined peak value and a predetermined frequency to the bridge circuit;

c) a differential amplifier detecting a change in voltage at one of the third and fourth junctions of the bridge circuit due to a change in inductance of one of the first and second variable inductors when the torque is applied to one of the first and second part of the torque sensor, said differential amplifier outputting an output voltage according to a difference between the voltage at the third junction and the voltage at the fourth junction;

d) a phase adjuster outputting a reference voltage waveform at the predetermined frequency, the reference voltage waveform having a peak value corresponding to one of the voltages at the third and fourth junctions when no torque is applied to the torque sensor, and the reference voltage waveform having a phase delay with respect to the alternating voltage of the oscillator corresponding to that of a voltage across one of the first and second variable inductors when no torque is applied to the torque sensor;

e) a first peak hold circuit for holding the peak value of the reference voltage waveform supplied from the phase adjuster;

f) a second peak hold circuit for holding a peak value of the output voltage from the differential amplifier;

g) an A/D converter for digitizing said peak value held in the second peak hold circuit;

h) a sign discriminator for detecting a sign signal based on the peak values from said first and second hold circuits; and i) a signal output circuit, connected to said sign discriminator and said A/D converter, for outputting an output signal based on said digitized peak value and said sign signal detected by said sign discriminator representing the direction and magnitude of the torque applied to the torque sensor.

8. A circuit for processing and detecting a signal from a torque sensor of a magnetostrictive type as set forth in claim 7, which further includes: a latch circuit interposed between the A/D converter and signal output circuit for latching the digital value of said second peak value and a display unit for displaying the signed signal of the digital value of the second peak value.

9. A circuit for measuring a vector physical quantity of a torque applied to an axle through a torque sensor, said torque sensor being interposed between one end of said axle and the other end of said axle, comprising:

a) a bridge circuit arranged to couple with the torque sensor, having a first arm thereof with a first resistor corresponding to a first iron loss and a first variable inductor connected in series with said first resistor, the inductance of said first inductor being varied according to the torque applied to the one end of said axle in an axial direction, a second arm having a first variable resistor $R_1$, a third arm having a second resistor corresponding to a second iron loss and a second variable inductor connected in series with said second resistor, an inductance of said first inductor being varied according to a torque applied to the other end of said axle in the axial direction, and a fourth arm having a second variable resistor $R_2$, a first junction defined between the first and second arms, a second junction defined between the third and fourth arms, a third junction defined between the first and fourth arms, and a fourth junction defined between the second and third arms, said first and second variable resistors being adjusted so as to provide equal voltages at the third junction and the fourth junction so as to balance the bridge circuit whenever the torque is not being applied to the axle;

b) an oscillator generating and outputting an AC voltage signal to said bridge circuit via the first junction and providing a reference AC voltage signal having a peak value, a predetermined frequency, and a phase equal to the voltage at either of the third and fourth junctions whenever the torque is not being applied to said axle;

c) a differential amplifier for detecting a difference in voltages between a voltage at the third junction and a voltage at the fourth junction of said bridge circuit when the torque is applied to the axle and outputting an output voltage signal according to the difference between the voltages at the third and fourth junctions;

d) a phase adjuster for outputting a reference voltage waveform at the predetermined frequency, the reference voltage waveform having a peak value corresponding to one of the voltages at the third and fourth junctions when no torque is applied to the axle, and the reference voltage waveform having a phase delay with respect to the phase of the AC voltage signal of the oscillator corresponding to one of a voltage across the first and second variable inductor when no torque is applied to the axle;

e) a first peak hold circuit for holding the peak value of the reference voltage waveform supplied from said phase adjuster;

f) a second peak hold circuit for holding a peak value of the output voltage signal of said differential amplifier;

g) an Analog-to-Digital converter for converting the peak value of the second peak hold circuit into a corresponding digital signal;

h) a sign discriminator for detecting a sign signal according to the peak values of said first and second peak hold circuits, said sign signal indicating a direction of the torque applied to the axle; and i) a signal output circuit which outputs the digital signal with the sign signal indicating the torque value and the direction of the torque.

* * * * *